INVENTOR.
Thomas E. Kirk
BY
C. R. Meland
ATTORNEY

United States Patent Office 3,560,832
Patented Feb. 2, 1971

3,560,832
BATTERY CHARGING SYSTEM FOR VEHICLES HAVING PROPULSION AND ACCESSORY BATTERIES
Thomas E. Kirk, Anderson, Ind., assignor to General Motors Corporation, Detroit, Mich., a corporation of Delaware
Filed May 5, 1969, Ser. No. 821,694
Int. Cl. H01m 45/05
U.S. Cl. 320—56                      7 Claims

ABSTRACT OF THE DISCLOSURE

A battery charging system for the batteries of an electrically powered motor vehicle. The motor vehicle has a bank of storage batteries which are utilized to energize a propulsion motor and at least one accessory battery which is utilized to energize accessories on a motor vehicle. The battery charging system is capable of charging both the propulsion batteries and the accessory battery from a household source of alternating current. The batteries are supplied with charging current from a bridge rectifier through control circuits that include controlled rectifiers that are periodically switched on and off to control the amount of power applied to the batteries. The charging cycle of the battery consists of an initial constant power mode, a constant voltage mode and finally a timed shut-off mode of operation all of which are controlled automatically by the battery charging system. The battery charging system is arranged such that the controlled rectifier which controls the charging current to the main propulsion batteries is also operative to connect the accessory battery to the main propulsion batteries when the vehicle is running so as to allow the accessory battery to float across the main propulsion batteries whenever the charge level of the accessory battery drops to some predetermined value.

---

This invention relates to a battery charging system for storage batteries and more particularly to a battery charging system for charging the propulsion and accessory batteries of an electrically powered vehicle.

In operating electrically powered vehicles some means must be provided for periodically charging the propulsion batteries of the motor vehicle after the vehicle has been used for a period of time. In some electrically powered vehicles an accessory battery is provided for feeding the accessory loads on a vehicle and this battery must also be periodically charged to provide proper operation during a running condition of the vehicle.

It is one of the objects of this invention to provide a battery charging system for the propulsion and accessory batteries of a motor vehicle wherein the charging cycle for the batteries can be initiated by the operator of the vehicle by simply connecting a power cord with a suitable source of household alternating current. In carrying this object forward a pair of switching devices, which preferably take the form of controlled rectifiers, are connected with the direct current output of a bridge rectifier that in turn is supplied with household alternating current. The switching frequency of the switching devices is controlled so as to control the amount of power delivered to the propulsion and accessory batteries during a charging cycle. The system is arranged such that both the propulsion and accessory batteries are charged with a constant power charging cycle for a length of time followed by a constant voltage charging cycle and this is followed by a timed shut-off period. The system includes timing circuits for automatically controlling the switching frequency of the controlled rectifiers and for automatically programming the charging cycle through the constant power mode, the constant voltage mode and finally the time shut-off mode.

When the electrically powered vehicle is in operation the propulsion batteries supply the drive motor of the electric vehicle and the accessory battery supplies the accessory loads on the vehicle, such as headlamps. It is desirable to maintain the accessory battery at some degree of charge during running of the vehicle and the present invention includes means for charging the accessory battery from the propulsion batteries whenever the state of charge of the accessory battery drops below a predetermined value.

It accordingly is another object of this invention to provide a battery charging system for an electrically powered vehicle wherein the propulsion batteries are capable of charging the accessory battery under certain conditions of operation. In carrying this object forward the switching device that controls the charging current supplied to the propulsion batteries, when these batteries are being charged, is utilized to control the current supplied to the accessory battery from the propulsion batteries when the vehicle is running.

Figure 1:
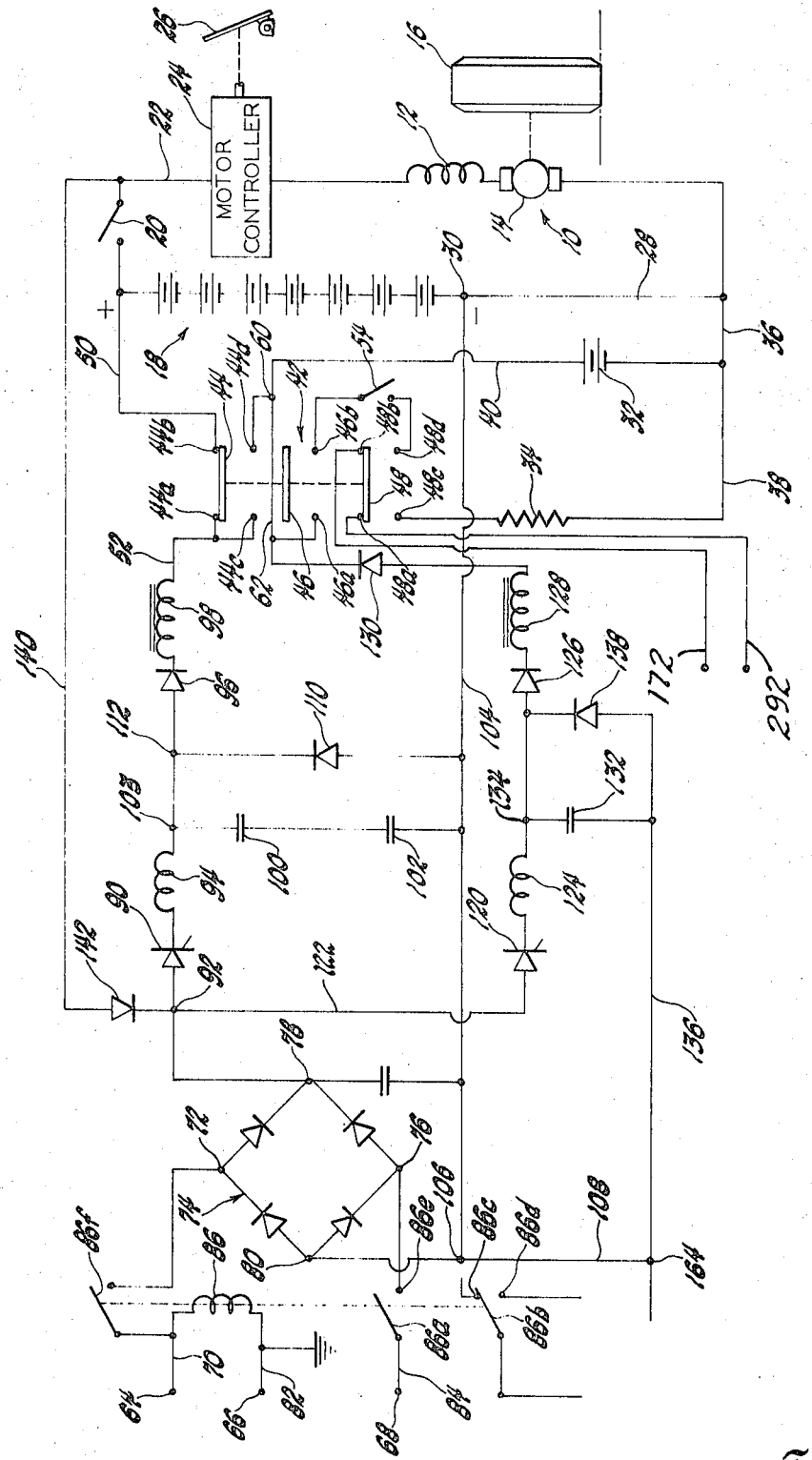
Figure 2:
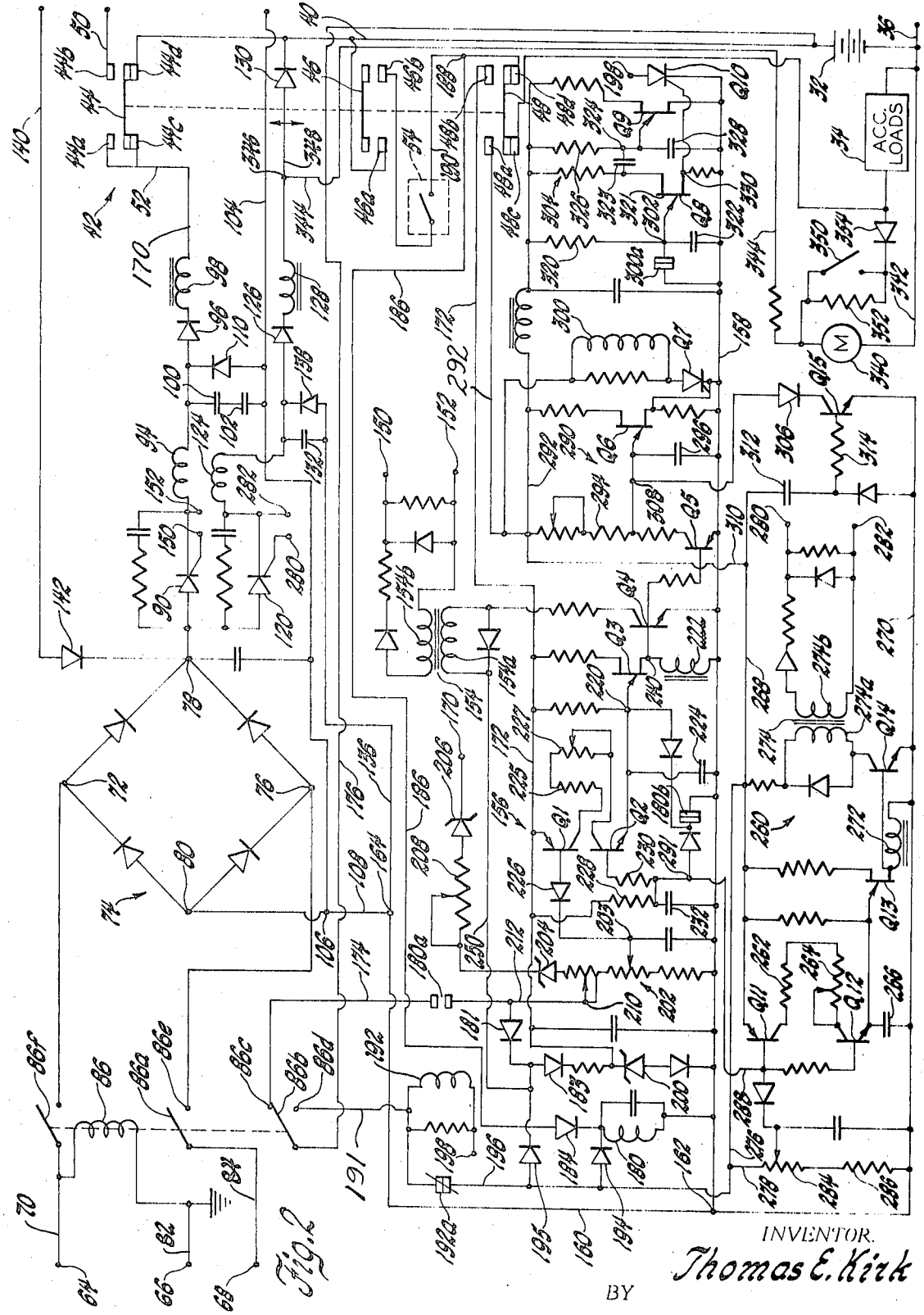
Figure 3:
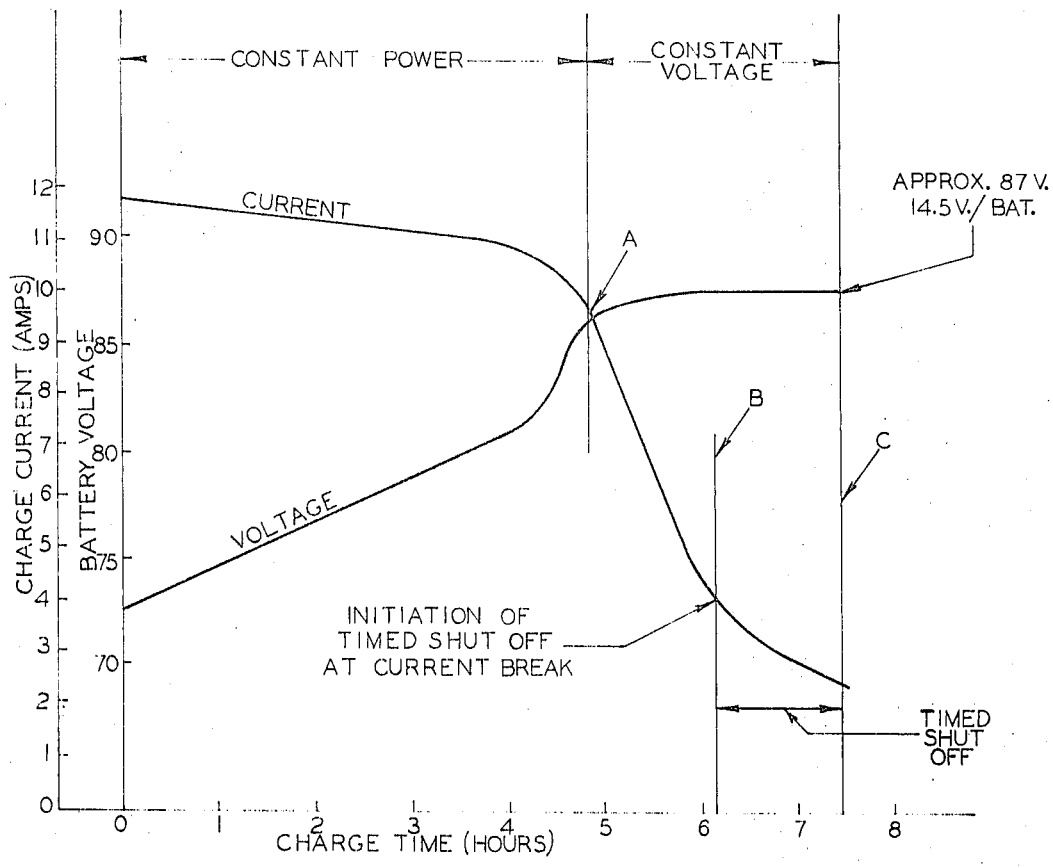

In the drawings:
FIG. 1 is a schematic circuit diagram of a battery charging system made in accordance with this invention;
FIG. 2 is a schematic circuit diagram illustrating the system of FIG. 1 in greater detail; and
FIG. 3 illustrates in graphical form the charge cycle for charging batteries when they are charged by the charging system of this invention.

Referring now to the drawings and more particularly to FIG. 1 the reference numeral 10 generally designates a series direct current propulsion motor for an electrically powered vehicle having a series field 12 and an armature 14 which is coupled to drive wheel 16 of the vehicle. The drive motor 10 is supplied with direct current by a bank of storage batteries designated by reference numeral 18. As shown in FIG. 1 there are seven series connected batteries and these are preferably of the lead-acid type and are preferably 12 volt batteries to provide a source voltage of 84 volts. It is to be understood, however, that the number of batteries can be varied and one can utilize six series connected batteries to provide a source voltage of 72 volts.

The positive side of the bank of batteries 18 is connected with a manually operable switch 20 which is connected in series with a conductor 22. The conductor 22 is connected in series with a motor controller shown in block diagram form and designated by reference numeral 24. The motor controller 24 is coupled to an accelerator pedal 26 and the arrangement is such that the accelerator pedal 26 determines the amount of voltage applied to the motor 10. The motor controller 24 can take various forms known to those skilled in the art and may be, for example, a controlled rectifier which has its conducting periods controlled as a function of accelerator pedal setting or might be a variable resistor coupled to the accelerator pedal 26. This controller forms no part of the present invention.

The motor controller 24 is connected in series with the motor 10 and a conductor 28 connects one side of the motor to the negative side of the bank of storage batteries 18 at junction 30.

The electrically powered vehicle has an accessory battery designated by reference numeral 32. The accessory battery 32 is preferably another 12 volt lead-acid storage battery and is used on the motor vehicle to energize accessory loads, for example vehicle headlamps, which have been illustrated as a resistor 34. It is to be understood that the propulsion batteries 18 are used for supplying power to the drive motor 10 whereas the accessory battery 32 is utilized to supply the accessory loads found on the vehicle. As will be more fully described hereinafter the system includes means for connecting the accessory battery 32 with the bank of propulsion batteries 18 to permit the accessory battery to be charged from the propulsion batteries during a running condition of the vehicle. It is seen from FIG. 1 that the negative side of the accessory battery 32 is connected with the negative side of the bank of propulsion batteries 18 through a conductor 36. The negative side of the accessory loads 34 through a conductor 38. The positive side of accessory battery 32 is connected with conductor 40.

The battery charging system for the batteries of the electrically powered vehicle includes a manually operable switch generally designated by reference numeral 42 which may be termed a charge-run switch. This charge-run switch 42 has ganged movable contacts 44, 46 and 48 which, when in the position shown in FIG. 1, set the control system for a charge operation or a mode of operation where the batteries will be charged from a source of household alternating current and when moved in an opposite direction set the control system for a running operation.

The contact 44 cooperates with fixed contacts 44a, 44b, 44c and 44d. The contact 46 will, at times, engage fixed contacts 46a and 46b when the switch 42 is shifted to the run position. The contact 48 engages fixed contacts 48a and 48b when the switch 42 is in the charge position and engages fixed contacts 48c and 48d when the switch 42 is in the run position.

The contact 44b is connected with the positive side of the propulsion batteries by conductor 50. The fixed contacts 44a and 44c are connected to conductor 52 while fixed contact 44d is connected with conductor 40. The fixed contacts 46b and 48d are connected whenever a manually operable switch 54 is closed and this switch can be a key operated switch for the vehicle. The fixed contacts 48a and 48b are connected respectively with conductors 292 and 172 the purpose of which will be described during the description of FIG. 2. It is seen that contact 46a is connected with conductor 40 at junction 60 via a conductor 62.

The battery charging circuits for the main propulsion batteries 18 and the accessory battery 32 will now be described. When the operator of the vehicle desires to charge the batteries he plugs in a power cord into a suitable receptacle and this power cord preferably has three prongs designated respectively by reference numerals 64, 66 and 68. The prong or terminal 64 is connected with a power supply conductor 70 which is connected with the AC input terminal 72 of a full-wave bridge rectifier designated by reference numeral 74 when relay contact 86f is closed. This bridge rectifier is formed of four diodes, as shown, and has another AC input terminal designated by reference numeral 76. The direct current output terminals of the bridge rectifier 74 are designated by reference numerals 78 and 80. The prong 66 of the power supply plug is connected to a grounded conductor 82 which is intended to be connected to the ground of a household AC system. The prong 68 is connected with the power supply conductor 84.

The input power supply system is controlled by a relay having a coil 86 which operates movable contacts 86a and 86b and 86f. The contact 86b cooperates with fixed contacts 86c and 86d whereas the contact 86a cooperates with a fixed contact 86e. The relay contacts in FIG. 1 are shown in a position wherein the plug is disconnected from the source of alternating current or in other words is not plugged in. When the plug is plugged in the relay coil 86 is energized causing contact 86f to close, contact 86a to engage fixed contact 86e and causing movable contact 86b to shift from contact 86c to contact 86d. When contacts 86a and 86f are in a closed position the AC input terminals 72 and 76 of the bridge rectifier are connected to the household source of alternating current of for example 115 volts.

The function of the movable contact 86b will be described hereinafter and this contact controls the battery charging system in a manner to be more fully described hereinafter when the system of FIG. 2 is described.

The control system for controlling the charging current which is used to charge the series connected propulsion batteries 18 will now be described. This charging system includes a controlled rectifier 90 having an anode connected with the positive side of the bridge rectifier 74 at junction 92. The cathode of controlled rectifier 90 is connected with an inductor 94 and this inductor is connected in series with diode 96. Another inductor 98 is connected in series between diode 96 and the fixed contacts 44a and 44c of the charge-run switch.

A pair of capacitors 100 and 102 are connected between junction 103 and a negative power supply conductor 104. The negative power supply conductor 104 is connected with the negative terminal 80 of the bridge rectifier 74 at junction 106 on conductor 108. It is also seen that the power supply conductor 104 is connected with the negative side of the propulsion batteries 18. A diode 110 is connected between conductor 104 and a junction 112 located between inductor 94 and diode 96.

The gate circuit for the controlled rectifier 90 will be described hereinafter and this gate circuit periodically applies a voltage to the gate of controlled rectifier 90 which gates it to a conductive condition. When controlled rectifier 90 is gated conductive the capacitors 100 and 102 are charged from a direct current output terminals of bridge rectifier 74 through inductor 94. It will be appreciated that inductor 94 and capacitors 100 and 102 form a resonant charging circuit and these capacitors will therefore be charged to a voltage which is approximately 1.7 times the direct output voltage of the bridge rectifier 74. This charging of the capacitors will now turn off controlled rectifier 90 since its cathode voltage is now raised to a higher potential than that of its anode.

When controlled rectifier 90 turns off the capacitors 100 and 102 will discharge into the propulsion batteries 18 to provide charging current for these batteries. This circuit can be traced from junction 103, through diode 96, through inductor 98, through contact 44 of the charge-run switch, through conductor 50, through the series connected propulsion batteries 18 and then through conductor 104 to the opposite side of the capacitors. At some point in time the current through inductor 98 will decrease causing a reversal of voltage across the inductor and the energy stored in this inductor is supplied to the propulsion batteries 18 through a circuit that includes the diodes 110 and 96.

The amount of power supplied to the propulsion batteries 18 by the circuit that has just been described will be a function of $\frac{1}{2} CE^2$ times the pulse frequency of the controlled rectifier 90 where C is the capacitance of capacitors 100 and 102 and E is the voltage to which the capacitors 100 and 102 are charged. It will be appreciated therefore that the power supplied to the propulsion batteries for charging these batteries will be a function of the switching frequency of the controlled rectifier 90. As will be more fully described hereinafter this switching frequency is controlled during the charging of the propulsion batteries 18.

The circuit for charging the accessory battery 32 includes a controlled rectifier 120 having its anode connected to the positive side 80 of the bridge rectifier 74 through conductor 122. The cathode of controlled rectifier 120 is connected with an inductor 124 and this inductor is connected in series with a diode 126, another inductor 128 and another diode 130. The cathode of diode 130 is connected with conductors 62 and 40 and therefore is connected to the positive side of the accessory battery 32. A capacitor 132 is connected between junction 134 and a negative power supply conductor 136.

The negative power supply conductor 136 is connected with the negative direct current output terminal 80 of the bridge rectifier 74 through conductor 108. A diode 138 is connected across the capacitor 132.

The gate firing circuit for controlled rectifier 120 will be described hereinafter and this circuit operates like the charging circuit for the propulsion batteries 18 to supply power to the accessory battery 32 the magnitude of which is a function of the switching frequency of controlled rectifier 120. Thus as controlled rectifier 120 is gated on, the capacitor 132 charges through inductor 124 which results in a reverse biasing of controlled rectifier 120 to turn it off. The capacitor 132 now discharges through diode 126, inductor 128, diode 130, conductor 40 and accessory battery 32, and then back to the negative side of capacitor 132 through conductors 36, 104, 108 and 136. When the voltage across the inductor 128 reverses energy stored in the inductor causes current to flow through the circuit including diodes 138, 126 and 130. The amount of power supplied to the accessory battery 32, as previously pointed out, is a function of the switching frequency of controlled rectifier 120 and this frequency as will be described hereinafter is controlled to provide a predetermined charge cycle for accessory battery 32.

The controlled rectifier 90 is utilized in the circuit to control the power that is applied to the propulsion batteries 18 when the switch 42 is set for the charge cycle and when the power supply plug for the system is plugged in. The controlled rectifier 90 also serves to connect the accessory battery 32 with the propulsion batteries 18 whenever the charge level of the accessory battery 32 drops to a predetermined value. This circuit is described in detail hereinafter but the circuit for connecting the propulsion batteries 18 and the accessory battery 32 is now described. When the switch 42 is in the run position the accessory battery 32 is connected with the propulsion batteries 18 through a circuit that can be traced from the positive side of the propulsion batteries 18, through switch 20 when it is closed, through conductor 140 and diode 142 to the anode of controlled rectifier 90, through inductor 94, diode 96 and inductor 98 to fixed contact 44c, through movable contact 44 which is now in a run position, through conductor 40 to the positive side of accessory battery 32, and then to the negative side of propulsion batteries 18 through conductor 36 and junction 30. As will be described the conduction of controlled rectifier 90 is controlled as a function of the terminal voltage of accessory battery 32 when the accessory battery 32 is floating across the propulsion batteries 18.

Referring now more particularly to FIG. 2 the gating circuits for controlled rectifiers 90 and 120 are illustrated as well as certain other control relays which have not been illustrated in FIG. 1. In FIG. 2 the same reference numerals have been used as were used in FIG. 1 to identify the same components in each figure. In addition, it will be appreciated that FIG. 2 does not disclose the drive motor 10 but the conductor connections thereto are shown in FIG. 2.

It is seen from FIG. 2 that the gate of controlled rectifier 90 is connected with a junction 150 whereas the cathode of this controlled rectifier is connected with junction 152. These two junctions apply gate signals to the controlled rectifier 90 and are also shown in FIG. 2 connected with the secondary winding 154b of a transformer 154. It is to be understood that the junctions 150 are electrically connected by a conductor (not illustrated) and the same is true for the junctions 152.

The voltage developed in the secondary winding of transformer 154 is controlled by an oscillator circuit generally designated by reference numeral 156. The circuit 156 is connected with a negative conductor 158 which in turn is connected with a conductor 160 at junction 162. The conductor 160 is connected with conductor 136 at junction 164 and this conductor therefore is at the negative direct current potential of the negative direct current output terminal 80 of the bridge rectifier 74.

The control circuit 156 receives an input control voltage from junction 170 on conductor 52 it being understood that junction 170 is electrically connected in FIG. 2 by a conductor which is not illustrated. The circuit 156 has a positive power supply lead 172 and voltage can be applied to this lead from conductors 174 or 191 depending upon the position of the contact 86b. This contact is in its up position engaging fixed contact 86c when the plug is disconnected from the source of alternating current which is the condition when the vehicle is running. It is noted that conductor 176 is connected with the positive side of the accessory battery 32 so that the direct voltage applied to conductor 172 will be a function of the voltage at the positive side of the accessory batteryy 32. One circuit that can connect the positive side of the accessory battery 32 and input conductor 172 includes a pair of normally open relay contacts 180a and diodes 181 and 183. The relay contacts 180a are controlled by relay coil 180. The relay coil 180 also controls normally closed relay contacts 180b connected with the emitter of a unijunction transistor Q3.

When relay coil 180 is energized contacts 180a will be closed and contacts 180b will open and when the relay coil 180 is deenergized the contacts 180a are open and the contacts 180b are closed. It is noted that one side of the relay coil 180 is connected with conductor 158 and therefore to the negative side of the bridge rectifier 74. The opposite side of relay coil 180 is connected in series with a diode 184 and in series with a conductor 186 connected to junction 188. The junction 188 is connected with a conductor 190 which in turn is connected between one side of the key switch 54 and the fixed contact 48d of the charge-run switch. It therefore will be appreciated that when the key switch 54 is closed and when contactor 46 engages fixed contacts 46a and 46b the relay coil 180 can be energized from the positive side of accessory battery 32, through conductor 40, through movable contact 46, through key switch 54 to junction 188 through conductor 186 to relay coil 180 and then to the negative side of accessory battery 32 through conductor 160, junction 164, conductor 108 and then to conductor 104 which is connected to conductor 36 as shown in FIG. 1.

The relay coil 180 can also be energized from conductor 196 and the normally closed relay contacts 192a controlled by relay coil 192. This circuit is through a diode 194 connected with conductor 196. One end of the relay coil 192 is shown connected with a junction 198 and this junction is further connected by a conductor means (not illustrated) to the anode of a controlled rectifier Q10. The relay coil 192 can only be energized when contact 86b engages the fixed contact 86d and when the controlled rectifier Q10 is conductive.

The positive direct voltage applied to conductor 172, through closed contacts 180a or from conductor 196 via diodes 195 and 183 is, is maintained at a predetermined value by the circuit including the Zener diode 200 connected across conductors 172 and 158. The circuit 156, which controls the firing of the controlled rectifier 90, has a voltage divider generally designated by reference numeral 202. One end of this voltage divider is connected with conductor 158 and the opposite end is connected in series with junction 170 through Zener diodes 204 and 206. In a 84 volt system the Zener diode 206 may have a break down voltage of 9 volts and the Zener diode 204 a 68 volt break down voltage. This means that the voltage applied across the voltage divider 202 will vary as the voltage of junction 170 varies which is positive propulsion battery voltage. If a 6 battery or 72 volt propulsion battery system is used the Zener diode 206 and variable resistor 208 can be eliminated with the Zener diode 204 being directly connected to junction 170.

The voltage divider 202 can receive another signal voltage from junction 210 and conductor 212 connected in series with the contacts 180a when contacts 180a are closed. This voltage is the potential of the positive side of the accessory battery 32 which can only be applied to the voltage divider 202 when the contact 86b is in its up position or in a position where the vehicle is running rather than the batteries being charged. It therefore is clear that the voltage divider 202 can receive a signal volage which is a function of the positive voltage of the propulsion batteries (junction 170) or can receive a signal voltage that is determined by the positive voltage of the accessory battery 32.

The oscillator control circuit 156 includes series connected transistors Q1 and Q2 with the emitter of transistor Q2 connected to a junction 220. The junction 220 is connected with the emitter of a unijunction transistor Q3 having one base electrode coupled to conductor 172 through a resistor and the other base electrode connected to conductor 158 through an inductor 222. The series connected transistors Q1 and Q2 together with the resistors 225 and 227 interconnecting these transistors and the capacitor 224 from an RC circuit which has a predetermined time constant. This time constant is varied by varying the conduction of transistor Q1 which has its base connected to the voltage divider 202 through a diode 226. The resistors 228 and 230 together with capacitor 232 and transistor Q2 provide a slow frequency buildup for the control circuit 156. When power is first applied to transistor Q2 it is biased nonconductive to therefore provide a low pulse frequency. As capacitor 232 charges through resistor 228 transistor Q2 is biased on slowly until it is biased fully conductive at which time it has no more control over the RC time constant of the RC circuit.

One end of capacitor 224 is connected with the emitter of transistor Q2, to junction 220 and to the emitter of the unijunction transistor Q3. When the capacitor 224 is charged to a predetermined voltage as determined by the conductivity of transistor Q1 which determines the RC time constant, the unijunction transistor Q3 is biased conductive between its emitter and one of the base electrodes connected with junction 240. The voltage of junction 240 will now bias the transistor Q4 conductive. The inductor 222 is utilized to shape the pulse applied across the base and emitter of transistor Q4. When transistor Q4 is biased conductive the primary winding 154a of transformer 154 is energized through a circuit that can be traced from conductor 196, through diode 195, through conductor 250, through primary winding 154a and then through the collector-emitter circuit of transistor Q4. If contacts 180a are closed and contact 86b engaging contact 86c the primary 154a could also be energized from conductor 174 through diode 181 and conductor 250. When primary winding 154a is energized a pulse of voltage is developed in the secondary winding 154b of transformer 154 which is of such a polarity as to gate the controlled rectifier 90 to a conductive condition.

The frequency of the pulses applied to the controlled rectifier 90, due to the charging and discharging of capacitor 224, is a function of the RC time constant of the circuit connected in series with capacitor 224 and including the transistor Q1. It will of course be appreciated that the circuit 156 is a variable frequency unijunction transistor oscillator and during a predetermined charging period for the propulsion batteries the controlled rectifier 90 is switched at a predetermined frequency in a manner to be more fully described hereinafter. The frequency of the circuit 156, which dictates the pulse frequency of controlled rectifier 90, will change as the conduction of transistor Q1 changes. Thus, as transistor Q1 is biased more non-conductive the RC time constant of the circuit is increased to lower the output frequency of oscillator 156. This happens as the voltage of junction 203 increases due to an increase in battery voltage sensed at junction 170. As will be more fully described hereinafter the propulsion batteries 18 are charged with a constant power mode of charging during the beginning of the charging cycle.

The oscillator control circuit for controlling the firing of the controlled rectifier 120, which is utilized to charge the auxiliary battery 32 when both the propulsion batteries 18 and accessory battery 32 are being charged from bridge rectifier 74, is generally designated by reference numeral 260. This oscillator or control circuit, like control circuit 156, is a unijunction transistor oscillator having a variable time constant RC circuit. The RC circuit is provided by transistors Q11 and Q12 connected in series with resistors 262 and 264 and in series with a capacitor 266. This circuit is connected across power supply conductors 268 and 270, the conductor 270 being a negative potential conductor by virtue of its connection to the conductor 160. The charging of the capacitor 266 determines the firing point of unijunction transistor Q13 which has one of its base electrodes connected to conductor 270 through an inductor 272. The base electrode of the unijunction transistor Q13, which is connected with the inductor 272, is connected with the base of transistor Q14. Therefore, when unijunction transistor Q13 is biased conductive it forward biases transistor Q14 and this transistor is connected in series with the primary winding 274a of a transformer 274. The primary winding 274a is connected with conductor 276 and this conductor and the conductor 278 are both connected with conductor 196.

The secondary winding 274b of transformer 274 is connected with junctions 280 and 282 and these junctions are connected respectively to the gate and cathode of controlled rectifier 120 by conductors which are not illustrated. It therefore will be appreciated that the controlled rectifier 120 will be switched on and off at a frequency determined by the unijunction transistor oscillator circuit 260. It is noted that the base of transistor Q11 is connected to the tap of a variable resistor 284 and this resistor together with resistor 286 form a voltage divider connected between conductor 276 and conductor 270. The base of transistor Q12 is connected with conductor 288 which in turn is connected with a junction 291.

The battery charging system includes another control circuit which is generally designated by reference numeral 290. This control circuit includes transistor Q5, unijunction transistor Q6 and a controlled rectifier Q7 connected as shown in FIG. 2. These transistors are connected across conductors 292 and 158, the conductor 292 being connected to the fixed contact 48a of the charge-run switch. It is noted that contact 48b of the charge-run switch is connected with conductor 172 and therefore when the charge-run switch is in the charge position the conductor 292 will be at a positive potential.

The transistor Q5 is connected in series with a voltage divider 294 and in parallel with a capacitor 296. It is also noted that the base of transistor Q5 is connected with the base of transistor Q4. It is pointed out that the base of transistor Q5 is connected with junction 240 and therefore each time the unijunction transistor Q3 turns on, which is the pulse frequency of controlled rectifier 90, the transistor Q5 will be biased on. Each time the transistor Q5 turns on it short circuits the capacitor 296 so as to prevent the capacitor from attaining sufficient charge to fire the unijunction transistor Q6. The charge time for capacitor 296 depends upon the RC time constant of the resistors 294 connected in series with the capacitor 296. When the pulse frequency of control circuit 156 drops to a predetermined value the capacitor 296 will have sufficient time to charge to a voltage which will bias transistor Q6 on. When this happens the controlled rectifier Q7 will be turned on.

The controlled rectifier Q7 is connected in series with a relay coil 300 which controls relay contacts 300a. The contacts 300a are normally closed but are opened whenever relay coil 300 is energized and this will happen when the pulse frequency of the control circuit 156 drops below a predetermined value. The relay contacts 300a are connected between junction 302 and conductor 158 and operate to control the operation of another control circuit generally designated by reference numeral 304 which is to be described.

The transistor Q15, which is connected in series with diode 306 and to junction 308 and therefore to the emitter of unijunction transistor Q6, provides a circuit which bypasses capacitor 296 during start-up to prevent false tripping of the circuit 290. When power is first supplied to the circuit transistor Q15 is biased on through conductor 310, capacitor 312 and resistor 314. As capacitor 312 charges the drive signal to transistor Q15 is reduced and it then turns off and no longer bypasses capacitor 296.

The control circuit 304 operates to terminate charging of the propulsion and accessory batteries at a predetermined time following the opening of relay contacts 300a. This control circuit 304 includes a resistor 320, a capacitor 322 and a unijunction transistor Q8 forming a unijunction transistor oscillator circuit. One of the base electrodes of unijunction transistor Q8 is connected to one side of a capacitor 323 the opposite side of this capacitor being connected with junction 324. The junction 324 is connected between a resistor 326 and a capacitor 328 and this junction is connected with the emitter of unijunction transistor Q9. One of the base electrodes of unijunction transistor Q8 is connected with junction 330 and this junction is connected to the gate of a controlled rectifier Q10. The anode of controlled rectifier Q10 is connected with junction 198 which in turn is connected to one side of relay coil 192 by a conductor which is not illustrated. The cathode of controlled rectifier Q10 is connected with conductor 158 as is apparent from an inspection of FIG. 2. It will be appreciated that when controlled rectifier Q10 is gated conductive the relay coil 192 will be energized to open contacts 192a. This removes voltage from the charging circuit to terminate charging of both the accessory and propulsion batteries.

The time period between the opening of contacts 300a and when controlled rectifier Q10 is gated conductive is determined by the control circuit 304. Thus, when control circuit 290 gates the controlled rectifier Q7 conductive relay coil 300 is energized causing contacts 300a to open and capacitor 322 can now charge through resistor 320. The resistor 320 has a high resistance, for example 22 megohms and the capacitor has a capacitance of 100 microfarads so that the capacitor 322 is charged at a relatively slow rate. The resistor 326, capacitor 328 and unijunction transistor Q9 form an oscillator circuit which causes transistor Q9 to turn on and off while capacitor 322 is being charged. Each time unijunction transistor Q9 is turned on a negative-going pulse is coupled to base 321 of unijunction Q8 through capacitor 323 to in effect reduce the interbase voltage of unijunction transistor Q8. With this circuit the negative-going pulse will initiate the firing or turning on of transistor Q8 and capacitor 322 will supply the necessary current to turn on transistor Q8 when capacitor 322 is charged to a predetermined voltage. When this happens the controlled rectifier Q10 is gated on to terminate the charging cycle for the propulsion and accessory batteries. The termination of charging is due to the energization of relay coil 192 when controlled rectifier Q10 turns on which opens contacts 192a. This removes power from the gate firing circuits of controlled rectifiers 90 and 120 to disconnect the batteries and bridge rectifier 74. The time between the opening of contacts 300a and the turning on of controlled rectifier Q10 may be as long as an hour.

The operation of the battery charging system of this invention will now be described. The battery charging system of this invention will provide a charging characteristic like that shown in FIG. 3 where charging current and battery voltage are plotted against time. FIG. 3 is the charging characteristic for six series connected 12 volt lead-acid propulsion storage batteries and a similar curve is produced for the seven series connected batteries disclosed herein except for a change in voltages and currents. Moreover, the charging curve for the accessory battery 32 is of the same shape except for a change in scale. Assuming now that the operator has plugged the system (prongs 64, 66 and 68) into a receptacle that is supplied with alternating current and further assuming that he has moved the charge-run switch 42 to the charge position both the propulsion batteries 18 and the accessory battery 32 will be charged. During the first portion of the charging cycle between approximately zero to five hours, as shown in FIG. 3, the batteries are charged with a constant power charging mode since the switching frequency of controlled rectifiers 90 and 120 is controlled by the oscillator circuits 156 and 260. During this charging cycle the output frequency of oscillators 156 and 260 remain substantially constant with the result that battery charging current decreases whereas battery voltage increases since the batteries are being charged. The power supplied to the batteries during this charging mode remains substantially constant. When the battery voltage reaches the point designated A on FIG. 3 the output frequency of oscillator circuits 156 and 260 will be reduced to provide a substantially constant voltage mode of charging between points A and C shown on FIG. 3. Point A occurs when the voltage at junction 170 reaches a predetermined value and this voltage is coupled into the oscillator 156 through Zener diodes 206 and 204. In regard to oscillator 260, which controls the charging frequency for the accessory battery, this voltage is coupled into oscillator 260 through conductors 196 and 278, the conductor 196 sensing positive accessory battery voltage 32 through conductor 176 and relay contacts 86b and 86d.

Point B of FIG. 3 is reached when the output frequency of oscillator 156 drops to a point where controlled rectifier Q7 is turned on. This initiates the timed shut-off between points B and C on FIG. 3, which is controlled by the circuit 304.

FIG. 3 only represents the charging current and voltages for the propulsion batteries but similar curves on a different scale and different slope result from the charging of the accessory battery 32 since the charging of these batteries are both controlled by oscillator circuits and both oscillator circuits are controlled as a function of respective battery voltage.

The control circuit for charging the accessory battery 32 from the propulsion batteries 18 will now be described. Assuming now that the plug is no longer connected to a source of alternating current and further assuming that the charge-run switch is in the run position it is possible for the propulsion batteries to supply current to the accessory battery. When the plug is disconnected from the source of alternating current the relay contact 86b is in the position shown in FIG. 2 and therefore lines 174 and 176 are connected. This connects the positive voltage of accessory battery 32 to junction 210 through conductor 212 and therefore supplies this voltage to the voltage divider 202, the relay coil 180 now being energized through a circuit that includes the key switch 54 and the contact 46 of the charge-run switch. The oscillator circuit 156 now responds to the voltage of accessory battery 32 and the controlled rectifier 90 periodically switches on and off to charge the accessory battery 32 from the propulsion batteries 18. This charging circuit for the accessory battery can be traced from the positive side of the propulsion batteries, through closed switch 20, through conductor 140 and diode 142, through the anode-cathode circuit of controlled rectifier 90, through contactor 44, which now engages fixed contacts 44c and 44d, into the positive side of accessory battery 32 through conductor 40 and then back to the negative side of the propulsion batteries 18 through conductor 36. During this mode of operation the accessory battery 32 floats across the propulsion batteries and the amount of voltage applied to the accessory battery is reduced due to the slow switching frequency of controlled rectifier 90. The switching frequency of controlled rectifier 90 is increased as the voltage of accessory battery 32 decreases and is decreased as the voltage of accessory battery increases. This switching frequency is of course again controlled by the RC circuit including transistor Q1, the conductivity of this transistor being controlled at this time by the voltage of the accessory battery 32.

When the controlled rectifier 90 controls the charging of accessory battery 32 from the propulsion batteries 18 the switching of this controlled rectifier will again cause the capacitors 100 and 102 to charge and discharge so that the amount of power supplied to the accessory battery is a function of the switching frequency of controlled rectifier 90. This switching frequency is selected to reduce a nominal input voltage of 84 volts of the accessory battery to some lower voltage, for example 14 volts, for charging the accessory battery 32. In this regard it is pointed out that during the time that both the propulsion batteries and the accessory battery are being charged the switching frequency of controlled rectifiers 90 and 120 are selected to reduce its input voltage to a proper voltage and power level for charging the batteries.

The control system, as shown in FIG. 2, includes a fan motor designated by reference numeral 340 connected between a conductor 342 and conductor 344. The conductor 342 is connected with the negative side of the accessory battery 32 whereas the conductor 344 is connected with junction 346 on conductor 348. A circuit is connected between one end of the accessory loads 34 and one end of the fan motor 340 which includes a manually operable switch 350, a resistor 352 and a diode 354.

The fan that is driven by motor 340 is used to cool the control circuits and the charging system. When the propulsion and accessory batteries are being charged the fan motor 340 is energized from the charging circuit for the accessory battery including controlled rectifier 120 via conductor 344. Where the charging circuit is developing for example 10 amperes 4 to 5 amperes is supplied to the accessory battery and the remainder is supplied to the fan motor. When the charge-run switch is in the run position the fan motor 340 is energized from the accessory battery.

The relay contacts 180b ensure that the oscillator circuit 156 always starts from a minimum frequency condition and that no transients during shut-off cause improper operation. Thus, the contacts 180b short circuit capacitors 224 and 232 until relay coil 180 is energized.

If desired the charge-run switch 42 can be operated in response to the movement of a cord reel (not illustrated) for the power cord of the charging system, the arrangement being such the switch 42 is shifted to its charge position when the cord is reeled out before plugging into a receptacle.

The shut-off or termination of charging for both the propulsion batteries 18 and the accessory battery 32 takes place at the same time but is controlled solely by completion of the charge cycle of the propulsion batteries. This is because the oscillator 156, which initiates the timed shut-off for both the propulsion and accessory batteries, is controlled solely in response to propulsion battery voltage. With this arrangement some variation can occur in the state of charge of the accessory battery 32 but the charge rates of the charging systems are so chosen as to ensure adequate charge of the accessory battery 32.

What is claimed is:

1. A battery charging system for a battery comprising, a source of direct current, a capacitor, a switching device, means connecting said switching device with said source of direct current and said capacitor whereby said capacitor is charged when said switching device is gated conductive, means connecting said capacitor with said battery, said capacitor discharging to supply charging current to said battery when said switching device is turned off, an oscillator circuit connected with said switching device for controlling the switching frequency of said switching device, said oscillator circuit maintaining the switching frequency of said switching device substantially constant over an initial charging period for said battery, said oscillator circuit having a voltage sensing circuit which is operative to control the output frequency of said oscillator circuit as a function of sensed voltage, means connecting said voltage sensing circuit with said battery, the output frequency of said oscillator circuit decreasing to thereby decrease the switching frequency of said switching device when the terminal voltage of said battery reaches a predetermined value, a shut-off control circuit operative to terminate the charging of said battery at a predetermined time after said shut-off control circuit is energized, means connecting said shut-off control circuit and said oscillator circuit such that said shut-off control circuit is energized when the output frequency of said oscillator circuit drops to a predetermined value to thereby initiate a timed shut-off charging period for said battery.

2. A battery charging system for charging at least one battery comprising, a source of direct current, a capacitor, means connecting said capacitor with said battery whereby said battery receives charging current from said capacitor when said capacitor discharges into said battery, a controlled rectifier connected between said source of direct current and said capacitor for periodically connecting and disconnecting said source of direct current and said capacitor, said capacitor discharging into said battery when said controlled rectifier is biased nonconductive, an oscillator connected with said controlled rectifier for determining the switching frequency of said controlled rectifier, said oscillator including a voltage sensing means and means for varying its output frequency as a function of the voltage sensed, means connecting said voltage sensing means with said battery whereby the output frequency of said oscillator is decreased when the terminal voltage of said battery reaches a predetermined value, a shut-off timing circuit which is operative to maintain said battery charging system in a charging mode for a predetermined length of time after it is energized, said shut-off timing circuit operative to terminate battery charging after said predetermined length of time has passed, and means for energizing said shut-off timing circuit whenever the output frequency of said oscillator drops below a predetermined value.

3. A battery charging system for charging the propulsion batteries and an accessory battery of an electrically powered vehicle comprising, input power supply conductors adapted to be connected with a source of alternating current, a bridge rectifier connected with said power supply conductors having direct current output terminals, a first battery charging circuit connected across said propulsion batteries, said first battery charging circuit including a first controlled rectifier and a first capacitor, said first capacitor connected across said propulsion batteries, said first controlled rectifier connected in series between one direct current output terminal of said bridge rectifier and said first capacitor, said first capacitor being charged when said first controlled rectifier is biased conductive and discharging into said battery when said first controlled rectifier is biased nonconductive, a second battery charging circuit connected with the direct current output terminals of said bridge rectifier and across said accessory battery, said second charging circuit including a second controlled rectifier and a second capacitor, said second capacitor connected across said accessory battery and said second controlled rectifier connected in series between said one direct current output terminal of said bridge rectifier and said second capacitor, said second capacitor being charged from said bridge rectifier through said second controlled rectifier when said second controlled rectifier is biased conductive and discharging into said accessory battery when said second controlled rectifier is biased nonconductive, and first and second oscillators connected respectively to said first and second controlled rectifier, said oscillators operating to determine respectively the switching frequencies of said first and second controlled rectifiers, said first oscillator including voltage responsive means connected with said propulsion batteries for reducing the output frequency of said first oscillator when the terminal voltage of said propulsion batteries reaches a predetermined value, said second oscillator including voltage responsive means coupled to said accessory battery for reducing the output frequency of said second oscillator when the terminal voltage of said accessory battery reaches a predetermined value.

4. The battery charging system according to claim 3 where a control circuit is provided which terminates the charging of both said propulsion and accessory batteries when the output frequency of said first oscillator drops to a predetermined value.

5. The battery charging system according to claim 3 where the battery charging system includes a control circuit for providing a timed shut-off for said battery charging system and wherein means are provided for initiating said timed shut-off whenever the output frequency of said first oscillator drops to a predetermined value.

6. A battery charging system for the propulsion and accessory batteries of an electrically powered vehicle comprising, power input conductors adapted to be connected with a source of alternating current, rectifier means for rectifying said alternating current to direct current, a battery charging system for charging said propulsion batteries from the direct current output of said rectifier means including a switching device and at least one capacitor, said capacitor connected across first and second output terminals of said battery charging system, said switching device connected in series between one direct current output terminal of said rectifier means and said capacitor, said capacitor being charged from said rectifier means when said switching device is conductive and applying charging current to said output terminals to thereby charge said propulsion batteries when said propulsion batteries are connected across said output terminals, an oscillator connected with said switching device for determining the switching frequency of said switching device, said oscillator including a voltage sensing means operative to vary the output frequency of the oscillator as a function of the voltage sensed, a control switch for connecting said output terminals of said charging system with said propulsion batteries or with said accessory battery, said control switch operative to connect input terminals of said charging system to said propulsion batteries when the output terminals of said charging system are connected with said accessory battery, said control switch further connecting said voltage sensing means of said oscillator to said propulsion batteries when said propulsion batteries are being charged by said rectifier means and connecting said voltage sensing means of said oscillator to said accessory battery when said control switch is in such a position as to provide charging of said accessory battery from said propulsion batteries.

7. A battery charging system for an electrically powered vehicle having a plurality of series connected propulsion batteries and at least one accessory battery comprising, power supply conductors adapted to be connected with a source of alternating current, a bridge rectifier connectable with said power supply conductors having direct current output terminals, a battery charging circuit having a pair of input terminals connected with the direct current output terminals of said bridge rectifier and a pair of output terminals which are selectively connectable with said series connected propulsion batteries or with said accessory battery, said charging circuit including a controlled rectifier and at least one capacitor, means connecting said capacitor across said output terminals of said charging circuit, said controlled rectifier connected in series between one direct current output terminal of said bridge rectifier and said capacitor, said capacitor being charged from said bridge rectifier when said controlled rectifier is conductive and discharging into said output terminals when said controlled rectifier is nonconductive, a control switch having a first position providing a connection between the output terminals of said charging circuit and said propulsion batteries for charging said propulsion batteries from said bridge rectifier and having a second position for charging said accessory battery from said propulsion batteries, said control switch in said second position connecting said propulsion batteries with said input terminals of said charging circuit and connecting the output terminals of said charging circuit with said accessory battery, an oscillator coupled to said controlled rectifier for determining the switching frequency of said controlled rectifier, said oscillator including voltage responsive means operative to vary the output frequency of the oscillator as a function of input voltage, and means coupling said voltage responsive means of said oscillator to said propulsion batteries when said control switch is in said first position and coupling said voltage responsive means of said oscillator to said accessory battery when said control switch is in said second position.

References Cited
UNITED STATES PATENTS

| | | | |
|---|---|---|---|
| 3,174,091 | 3/1965 | Ferranto | 320—1 |
| 3,206,610 | 9/1965 | Lovrenich | 320—15 |

JAMES D. TRAMMELL, Primary Examiner

U. WELDO, Assistant Examiner

U.S. Cl. X.R.

320—15, 31, 39, 43